(No Model.)  2 Sheets—Sheet 1.

F. H. RICHARDS.
WEIGHING MACHINE.

No. 585,974.  Patented July 6, 1897.

Witnesses:
O. W. Smith
Fred. J. Dole

Inventor:
F. H. Richards

THE NORRIS PETERS CO., PHOTO-LITHO., WASHINGTON, D. C.

(No Model.) 2 Sheets—Sheet 2.

F. H. RICHARDS.
WEIGHING MACHINE.

No. 585,974. Patented July 6, 1897.

Witnesses:
C. W. Smith
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,974, dated July 6, 1897.

Application filed March 11, 1897. Serial No. 626,960. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus, the main object being to provide an improved apparatus of this character intended more especially for weighing small quantities of material, such as breakfast foods, for delivery to suitable receptacles, the apparatus comprehending also a movably-mounted or tilting table or platform for supporting a receptacle to be filled and a device for discharging a load, said device being coöperative with the tilting table.

Figure 1:
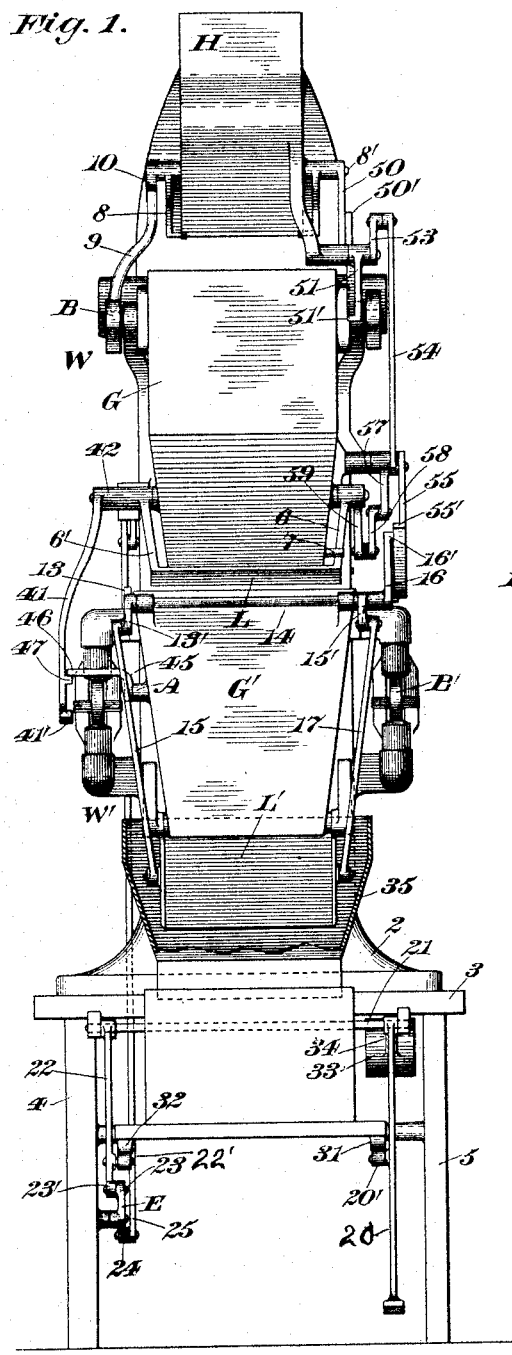
Figure 2:
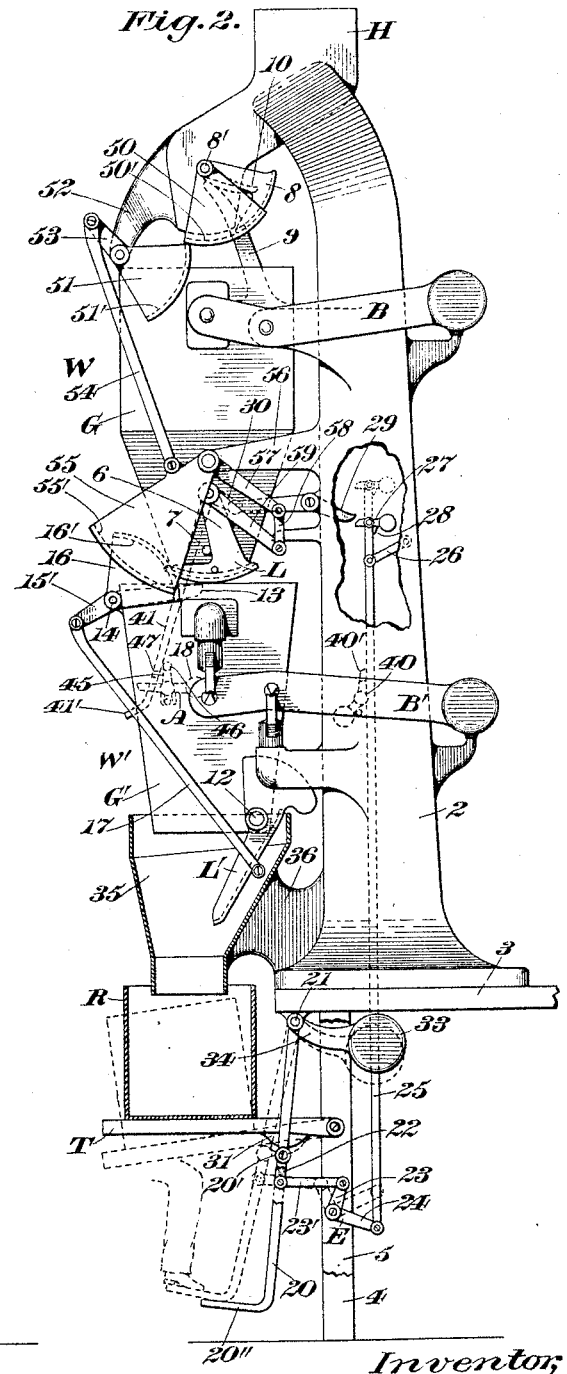
Figure 3:
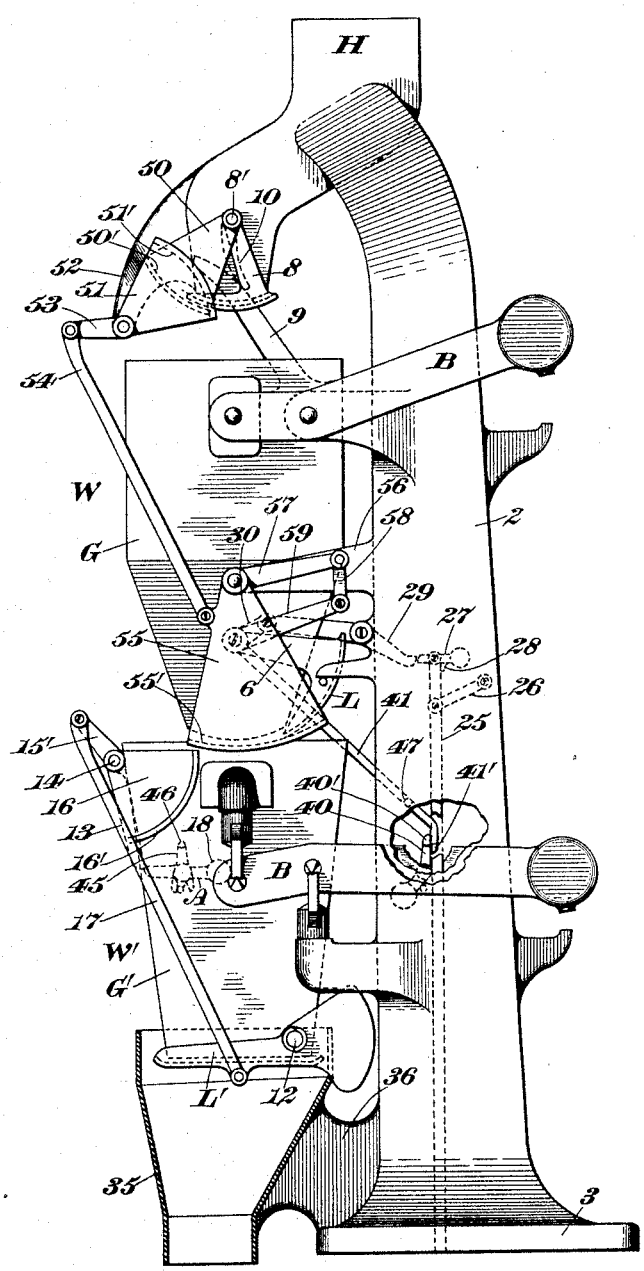

In the drawings accompanying and forming part of this specification, Figure 1 is a front elevation of my improved weighing apparatus. Fig. 2 is an end elevation of the apparatus as seen from the left in Fig. 1, showing, by full and dotted lines, the action of the tilting table and its connected parts; and Fig. 3 is an end elevation of the weighing mechanism, on an enlarged scale, as seen from the left in Fig. 1.

Similar characters designate like parts in all the figures of the drawings.

For supporting the various parts of the weighing mechanism or mechanisms any suitable means may be employed, but I have represented for this purpose the column or upright 2, which has at its upper end the chute or hopper H of ordinary construction, which constitutes a convenient means for delivering the supply of material to the weighing mechanisms, as a plurality of the latter are employed.

The column or standard 2 is represented set upon the bracket or shelf 3, which is sustained at its opposite ends by the uprights 4 and 5, respectively, which rest upon the floor of a building or other structure.

My present invention comprehends two individually-operative weighing mechanisms, one of which is adapted to discharge its load or a part thereof into the other, said weighing mechanisms being designated, respectively, by W and W', the capacity of the former, which is located over the latter, being slightly in excess of that of the other.

Each of the weighing mechanisms, as usual, consists of a suitable load-receiver and a supporting scale-beam therefor, the load-receiver for the weighing mechanism W being designated by G, while its beam is designated by B and the load-receiver for the weighing mechanism W' being designated by G' and its beam by B'. Each of the scale-beams B and B' comprises a pair of longitudinal arms joined at the rear by a cylindrical weight which when the weighing mechanisms are not in use rest on suitable stops on the column or standard 2, said beam-arms being also pivotally mounted on brackets extending forward from said column and being connected with the respective load-receivers in some well-known manner.

The load-receiver G has in its bottom a discharge-outlet to permit its contents or a part thereof to gravitate into the load-receiver G', which is situated in line therewith, said outlet, however, being normally covered by a suitable closer or discharge-valve, such as L, which has upright arms 6 and 6', respectively, having at the ends thereof sleeves or hubs, through which are passed suitable pivots or pins journaled in the opposite end walls of the load-receiver. The center of oscillation of the closer or discharge-valve L is on a vertical line passing through the center of the load-receiver, the arm 6 of said closer being against the pin or stop 7 on the load-receiver when said closer is shut, as represented in Fig. 2. The closer L is made comparatively heavy, so that it can shut itself when released from its open position, as will hereinafter appear.

The hopper H is intended to deliver a stream of material to the load-receiver G to build up the load therein, and the outlet of said hopper is controlled by a suitable valve, such as 8, which is of the "oscillatory" kind, said valve being pivoted at 8' to the hopper and being a self-closing valve, it having a preponderance of weight below its axis of operation to effect this action, the closure of the valve being suitably controlled, as from the beam B, which has the rigid upright arm 9 connected therewith and slightly curved, said arm being coöperative with a short curved arm 10, which is rigidly attached to the valve 8. The adjacent curved faces of the two arms 9 and 10 are adapted to run in contact.

In Fig. 2 the valve 8 is represented in its wide-open position, so that the full volume of the stream from the hopper H can enter the empty load-receiver G and at a predetermined time cause the latter, and consequently the poising side of the beam B, to descend, whereby the rigid arm 9, swinging through an arc to the left with the beam B and falling away from the arm 10 will permit the valve 8 to close by its own weight to cut off the stream from the hopper H, the stream being cut off when the load in the receiver G is completed. On the emptying of the load-receiver G and its ascent with the poising side of the beam B the reverse action with respect to the arm 9 will take place, so that the latter, by impinging against the arm 10, can force the valve 8 open. The discharge valve or closer of the load-receiver G regulates the supply to the load-receiver G', the receiver G being in the nature of a rough weigher or meter, and its closer L will be held wide open until the load in the receiver G' reaches completion, when it will be instantly released and can be shut by its own weight, as hereinbefore set forth.

The load-receiver G' has an outlet in its bottom which is controlled by a closer, as L', which consists, preferably, of a flat plate pivotally supported at 12 at one side of the discharge-outlet, said plate being situated, when shut, contiguous to the lower edge of the load-receiver G', as illustrated in Fig. 3.

The closer L' has the usual counterweighted end plates for shutting the same on the discharge of a load from the load-receiver G'.

The discharge of the load-receiver G' will be preferably controlled by the weighing mechanism W or the discharge-valve L thereof, as will hereinafter appear, and the means for governing the discharge of the load-receiver G' include as a part thereof a latch, as A, which is adapted to engage a suitable member connected with the closer L', such a member being represented herein as the rocker 13, which is carried by the shaft 14 on the load-receiver, said rocker having the arm 13' connected by the rod 15 to the closer L'. (See Fig. 1.) The shaft 14 has connected thereto at its opposite end the segment or interlocking stop 16, to the arm 15' of which is pivoted the rod 17, the latter being likewise connected with the closer and moving in parallelism with the rod 15. The latch A is pivoted to the load-receiver G', its action being limited by suitably-positioned stops, as is the custom, the forward arm of said latch being thrown into engagement with the free end of the rocker or arm 13 on the shaft 14 by the action of a counterweight, such as 18.

In connection with weighing mechanism or mechanisms a tilting table or platform, as T, is provided, it being pivotally connected in some suitable manner with the uprights or supports 4 and 5, respectively, said table being intended to support a receptacle, such as R, to receive the measured charge from the load-receiver G and being upheld or maintained in its normal position by a treadle, as 20, and the discharge of the weighing mechanism W or the load-receiver G thereof will preferably be controlled or effected by means coöperative with said tilting table, so that the load-receiver G, and consequently the load-receiver G', cannot be emptied until a receptacle or box is in position to receive the load.

The treadle 20 is affixed to the rock-shaft 21, journaled in suitable brackets depending from the shelf 3, such shaft having at its opposite end the rod 22, which is pivoted at its lower end to the link 23', the latter in turn being similarly connected to the arm 23 of the lever E, which is of the "angle" type and is suitably pivoted to the upright 4. The arm 24 of said lever has the rod 25 pivoted thereto, said rod being connected with the standard 2 through the intermediate guide-link 26. The rod 25 has thereon, preferably at its upper end, a device for opening the closer L or load-discharge valve of the rough weighing mechanism, such a device being represented herein as the by-pass 27, which has its rear arm counterweighted and provided with a pin 28, normally bearing against the rod 25. The column 2 at its forward side and at a point adjacent to the load-receiver G pivotally supports a lever 29, the inner end of said lever being pivoted to the crank-arm 30, that extends from the hub on the closer-arm 6', the free arm of said lever being disposed in the path of movement of the by-pass-actuating device 27 for operation thereby.

The treadle 20 in connection with the rod 22, which moves in parallelism therewith, is adapted to uphold the tilting table T, said treadle being shiftable in two directions, it being shifted in one direction by a suitable mechanical appliance and in the other by the foot of an attendant. The treadle 20 and the bar 22 are furnished with projections 20' and 22', which are in the form of antifriction-rolls running in contact with the cams 31 and 32, respectively, which are suitably attached to the under face of the tilting table T. The treadle 20 is shifted rearward by the foot of an attendant and oppositely by a suitable device, as the weight 33 on the outer end of the arm 34, attached to the transverse rock-shaft 21.

A discharge-hopper is represented at 35 and is situated below the load-receiver G', said hopper constituting a convenient means for directing the charge of material from the load-receiver G' to a receptacle, as R, on the tilting table T, and said hopper 35 is at its delivery end somewhat reduced, whereby it will temporarily retain a sufficient quantity of material for acting against the closer L' sufficiently to retard the shutting of said closer L' to cause the complete emptying of the load-receiver G'. The hopper is represented joined to the bracket 36, situated near the lower end of the column 2.

The table T, the treadle 20, and the by-pass actuator 27 are represented occupying their normal positions in dotted lines in Fig. 2, said actuator being situated at a point above the rocking lever 29. In this figure the rolls 20' and 22' are illustrated by dotted lines in contact with the forward ends of the two cams 31 and 32, respectively, at about the point where they merge into the under face of the table T. A receptacle, as R, will then be placed on the tilting table and the foot of the attendant will be applied to the foot-piece or toe 20'' on the treadle 20 to shift the latter rearward or to the position shown in full lines in Fig. 2. As the treadle is thus shifted the rod 22 will move simultaneously therewith, so that the two rolls 20' and 22' will be caused to run along the two cams 31 and 32, whereby the table T will be elevated, the latter reaching a horizontal position when said rolls are opposite the widest portion of the two cams. As the treadle 20 and the rod 22 are simultaneously operated by the attendant the link 23' will be thrust inward, thereby rocking the angle-lever E from its dotted-line to its full-line position and simultaneously drawing the rod 25 downward and carrying the by-pass actuator 27 against the free end of the rocking lever 29, the free arm of said lever being drawn downward and the other arm thereof being oppositely rocked, so that it will force the closer or load-discharge valve L to its wide-open position, as indicated in Fig. 3, where said closer is held by suitable means, as will hereinafter appear. The rod 25 will continue to move downward until the by-pass actuator 28 thereon has passed to a point below the free end of the rocking lever 29, as shown in Fig. 2 by full lines, it being understood that the actuator is held effective by the pin 28. As the closer L is thus opened the contents of the load-receiver G will be emptied into the load-receiver G', or so much of said contents as are necessary to load the receiver G'.

For the purpose of holding the closer L in its wide-open position I prefer to employ means operative with the weighing mechanism W', such as the by-pass stop 40 thereon, which coöperates with the depending rod 41, attached to the hub 42 of the closer L, the by-pass stop 40 being of ordinary construction and situated on the counterpoised side of the beam B' or that part thereof between its fulcrum and its counterweight C. The depending rod 41 has thereon at a point near its lower end the inwardly-extending lug 41', the purpose of which will now appear. The by-pass 40 is pivoted in some suitable manner to the scale-beam B', and is maintained in its operative position by a counterweighted arm which normally rests on a suitably-positioned pin on the scale-beam in the ordinary manner. When the closer L is opened, as just specified, the rod 41 will be swung therewith, and when the closer has nearly reached its wide-open position the projection or lug 41' on the rod 41 will engage the corresponding and oppositely-disposed projection 40' on the upper arm of the by-pass, so that the latter will be swung about its center to permit the rod to pass thereby. When this last-mentioned action has taken place, the by-pass will be caused to resume its normal position by the counterweight, and the projection 40' thereof will prevent the return of the rod 41 by engaging the lug 41' thereon until the load in the receiver G' has been completed.

When a certain percentage of the material discharged from the load-receiver G has entered the load-receiver G', it being understood that the closer L' is latched shut, said load-receiver G', and consequently the poising side of the beam B', will be caused to descend, thereby elevating the counterpoised side of the beam B' and consequently the by-pass stop 40, so that when the projection 40' has reached a point above the corresponding projection 41' on the rod 41 the latter, and consequently the closer L, will be released, whereby the closer will promptly shut to cut off the supply to the load-receiver G', it being understood that the capacity of the load-receiver G is slightly in excess of that of the load-receiver G'.

The rod 41, in addition to coöperating with the by-pass stop 40 to hold the closer L in its wide-open position, also constitutes a tripper for the latch A on the load-receiver G'. The latch A has on its upright arm 45 the longitudinal laterally-disposed pin 46, (see Fig. 1,) which is disposed in the path of movement of the lug 47 on the inside of the rod 41. When the closer L has cut off the supply from the load-receiver G, said rod 41 will have a slight advancing movement beyond this position, during which the projection or lug 47 will impart a blow to the pin 46 of the latch A to swing the working arm of said latch downward, whereby said latch will be disengaged from the rocker 13, that is connected with the closer L', the rod 41 having a further movement after it trips the latch A. When said latch is tripped, the closer L' will be released and will be forced open by the mass in the load-receiver G', the material being emptied into the hopper 35, where it acts against the closer L' to hold the latter open until the load-receiver G' is completely emptied. The material from the load-receiver G' will then gravitate into the receptacle R to fill the same, the table T on which the receptacle is resting being upheld by the treadle 20 by pressure applied thereto by the foot of the attendant. When the receptacle R is filled, the attendant will remove the same and at the same time withdraw his foot from the foot-piece 20'' of the treadle 20, whereby the latter will be shifted or thrown to its dotted-line position by the dropping of the weight 33. As the parts are thus shifted the rod 25 and by-pass actuator 27 will be thrust upward by reason of the intermediate connections between said rod and the treadle, and during said action the by-pass 27 will engage and will be swung about its center by the rocking lever 29, so that said by-pass can reach a point above the lever to again operate the same on the downstroke of the rod 25 in the manner hereinbefore specified.

In connection with the supply-controlling valve 8 and the closer L reciprocally-effective interlocking stops are employed, whereby these parts cannot be opened at the same time, the stops being designated by 50 and 51, respectively, and being represented herein as segmental plates having oppositely-disposed flanges along their edges, said flanges being designated, respectively, by 50' and 51'. The interlocking stop 50 is suitably secured or cast integral with the hub of the valve 8, while the stop 51 is pivotally supported by the arm 52, that extends forward from the hopper H, said stop 51 having the crank-arm 53 connected by the rod 54 to the interlocking stop 55. The interlocking stop 55 is pivoted to the arm 56 on the column 2, and has the crank-arm 57, which is connected by the link 58 to the crank-arm 59 of the closer L. The action of the two stops will be understood by an inspection of Figs. 2 and 3 of the drawings. In Fig. 2 the flange 51' is represented contiguous with the under face of the flange 50', this relation continuing so long as the valve 8 is open, whereby the flange 50' will prevent the oscillation of the stop 51. When the valve 8 shuts, as indicated in Fig. 3, the interlocking stop 50 will have been carried across the plane of the inside face of the flange 51', thereby releasing the stop 51, and consequently, through the intermediate connections, the closer L. When the closer L is opened in the manner hereinbefore set forth, the two crank-arms 59 and 57 will be simultaneously swung upward by the closer L, acting through the connecting-link 58, so that the interlocking stop 55 will be rocked to the right, thereby drawing the rod 54 and the crank-arm 53 downward and oppositely swinging the interlocking stop 51, whereby the inside face of the flange 51' is adapted to run substantially in contact with the inner end of the coacting flange 50' to thereby block the action of the interlocking stop 50, and consequently the valve 8, until the closer L is shut. The interlocking stop 55 coöperates with the interlocking stop 16, so that the two closers L and L' cannot be simultaneously opened, the two interlocking stops 55 and 16 having oppositely-disposed flanges 55' and 16', respectively. The operation of the two interlocking stops 55 and 16 being similar to the stops 50 and 51, a detailed description thereof is not deemed necessary, their action being clearly illustrated by Figs. 2 and 3.

The operation of the hereinbefore-described machine, briefly stated, is as follows: In Fig. 2 the valve 8 is represented wide open and the closer L shut, so that a stream of material from the hopper H will enter the load-receiver G, and when a certain part of the load to be weighed has been received by said load-receiver it, with the poising side of the beam B, will descend, whereby as the curved arm 9 falls away from the coöperating arm 10 of the valve the latter will be closed progressively to reduce and subsequently cut off the stream from the hopper, the latter action taking place when the load in the receiver G is completed. The attendant will then place a suitable receptacle, as R, on the table T, which is in its tilted dotted-line position, the treadle 20 and the by-pass actuator 27 being also represented occupying their normal positions. (Shown by dotted lines in said figure.) When the receptacle R is properly positioned beneath the outlet of the discharge-hopper 35, pressure will be applied to the foot-piece 20'' of the treadle 20 to thereby shift the same rearward or to the full-line position, (indicated in Fig. 2,) whereby the shaft 21 will be rocked to move the rod 22 simultaneously rearward with said treadle. As the treadle and rod are thus shifted the rolls 20' and 22' will be caused to move under the cams 31 and 32 to elevate the table T to its horizontal position, and simultaneously therewith the rod 25, by reason of its intermediate connections with the treadle, will be drawn downward, thereby carrying the by-pass actuator into engagement with the free end of the rocking lever 29 to swing the closer L to its wide-open position, the rod 41 being moved therewith and being engaged and held by the by-pass 40 when it has nearly reached the end of its stroke, as herein specified. When the closer L is opened, the contents from the load-receiver G will pour into the load-receiver G', and when the latter has received a certain percentage of said contents it, with the poising side of the beam B', will descend, the opposite portion of the beam B' ascending and carrying the projection 40' of the by-pass 40 above the corresponding projection 41' on the rod 41, whereby said rod, and hence the closer L, are released, when the latter promptly shuts. When the rod 41 is released, it will swing rapidly to the left, so that the projection 46 thereon will impart a blow to the latch A, as hereinbefore specified, to trip such latch and release the closer L', so that the latter will be forced open to permit the load in the receiver G' to pass into the discharge-hopper 35 and from thence into the receiver R, which when filled can be removed. When the entire contents from the load-receiver G' have passed therefrom, its closer L' will be shut and the weighing mechanism W' will resume its normal position, the weighing mechanism W having returned to its initial position on the discharge of the load-receiver G. When the receptacle R is filled, the attendant will release the treadle 20, so that the latter can be shifted forward by the dropping of the counterweight 33, during which action the rod 25 will be thrust upward in the manner hereinbefore specified to move the bypass 27 to a point above the free arm of the rocking lever 29 or to the position to again operate said lever on the next operation of the machine.

Having described my invention, I claim—

1. The combination, with weighing mechanism embodying a load-receiver, of a table for supporting a receptacle; a treadle adapted to uphold said table; and means for effecting the discharge of said load-receiver, said means being connected with the treadle for operation.

2. The combination, with weighing mechanism embodying a load-receiver provided with a closer, of a table for supporting a receptacle; a treadle adapted to uphold said table; and means for opening said closer, said means being connected with the treadle.

3. The combination, with weighing mechanism embodying a load-receiver provided with a closer, of a lever connected with said closer; a table for supporting a receptacle; a treadle adapted to uphold said table; and a device connected with the treadle for engaging said lever.

4. The combination, with a load-receiver having a closer, of a scale-beam for supporting said load-receiver; a valve having an arm movable therewith; a coöperating arm rigid with said scale-beam for controlling the actions of the valve; a table for supporting a receptacle; a treadle adapted to uphold said table; and means for operating said closer, said means being connected with the treadle for operation.

5. The combination, with weighing mechanism embodying a load-receiver, of a table for supporting a receptacle, said table having a cam; a treadle having a projection coöperative with said cam; and means for effecting the discharge of said load-receiver, said means being connected with the treadle for operation.

6. The combination, with weighing mechanism including a load-receiver, of a table for supporting a load-receiver, said table having cams thereon; a shaft furnished with a rod and with a treadle, said rod and treadle having projections coöperative, respectively, with said cams; and means connected with said rod for effecting the discharge of the load-receiver.

7. The combination, with weighing mechanism including a load-receiver, of a table for supporting a receptacle, said table having cams; a shaft; a rod and a treadle fixed to said shaft, said rod and treadle having projections thereon coöperative with the cams; and a second rod provided with means for effecting the discharge of the load-receiver, said rod being connected with the first-mentioned rod for operation.

8. The combination, with weighing mechanism embodying a load-receiver, of a tilting table for supporting a receptacle; a shaft and a rod and a treadle having projections coöperative with cams on the tilting table; a lever connected with said rod by a link; and a second rod attached to said lever, said rod carrying means for effecting the discharge of the load-receiver.

9. The combination, with weighing mechanism embodying a load-receiver provided with a closer, of a rocking lever connected with said closer; a table for supporting a receptacle, said table having cams thereon; a shaft; a rod and a treadle fixed to said shaft and having projections coöperative, respectively, with said cams; a lever; a link connecting one arm of the lever with said rod; a second rod connected with the other arm of said lever; and a by-pass device on said rod for operating said rocking lever.

10. The combination, with weighing mechanism embodying a load-receiver, of a table for supporting a receptacle; a treadle adapted to uphold said table and shiftable in one direction to elevate the table; means for oppositely shifting said treadle; and instrumentalities connected with said treadle for effecting the discharge of the load-receiver.

11. The combination, with weighing mechanism embodying a load-receiver, of a tilting table for supporting a receptacle; a treadle adapted to uphold said table; a counterweight connected with the treadle; and means for effecting the discharge of said load-receiver, said last-mentioned means being also connected with the treadle for operation.

12. The combination, with weighing mechanism including a load-receiver, of a table for supporting a receptacle; a treadle adapted to uphold said table; means connected with said treadle for effecting the discharge of said load-receiver; independently-operative weighing mechanism also including a load-receiver; and instrumentalities coöperative with the first-mentioned weighing mechanism for effecting the discharge of the load-receiver of the last-mentioned weighing mechanism.

13. The combination, with a load-receiver and with a supporting scale-beam therefor, of a second load-receiver also having a supporting scale-beam and each of the load-receivers having a closer; means for opening the closer of the first-mentioned load-receiver; a rod connected with the first-mentioned closer; and a stop on the second-mentioned beam for engaging said rod on the opening of the first-mentioned closer for also releasing said rod at a predetermined time.

14. The combination, with a load-receiver and with a supporting scale-beam therefor, said load-receiver having a closer, of a second load-receiver also having a supporting scale-beam, said load-receiver having a closer and also having means for holding the same against movement, said means including a latch; a table; a treadle adapted to uphold the table; means connected with said treadle for opening the first-mentioned closer; and instrumentalities operative with the latter for tripping said latch.

15. The combination, with a load-receiver and with a supporting scale-beam therefor, said load-receiver having a closer, of a second load-receiver having a supporting scale-beam and also provided with a closer; instrumentalities including a latch, for holding said last-mentioned closer against movement; a table for supporting a receptacle; a treadle adapted to uphold said table; means connected with said treadle for opening the first-mentioned closer; a rod connected with the latter; a stop on the second-mentioned scale-beam for engaging said rod and for also releasing the same at a predetermined time; and means on said rod adapted to trip said latch.

16. The combination, with two weighing mechanisms one of which is located over, and is adapted to discharge the contents of, the other; a discharge-hopper located below the lower weighing mechanism; a table for supporting a receptacle; a treadle adapted to uphold said table; and means for discharging the upper weighing mechanism, said means being connected with the treadle for operation thereby.

17. The combination, with a load-receiver having a closer provided with a crank-arm, of an interlocking stop on the framework, said interlocking stop being furnished with a crank-arm connected with the first-mentioned crank-arm; and a second load-receiver also having a closer provided with an interlocking stop which is coöperative with the first-mentioned interlocking stop.

FRANCIS H. RICHARDS.

Witnesses:
FRED. J. DOLE,
HENRY BISSELL.